United States Patent Office 3,845,001
Patented Oct. 29, 1974

3,845,001
SMOKE RETARDANT COMPOSITIONS
Lawrence C. Mitchell, Southfield, Mich., assignor to Ethyl Corporation, Richmond, Va.
No Drawing. Filed Nov. 8, 1971, Ser. No. 196,801
Int. Cl. C08f 45/40, 45/56
U.S. Cl. 260—31.8 R                8 Claims

ABSTRACT OF THE DISCLOSURE

Copper compounds, alone or admixed with molybdenum compounds, impart smoke retardant properties to combustible materials such as plastics. Thus for example, polyvinyl chloride does not emit as much smoke during combustion when it is compounded with $Cu_2O$ or mixtures of $MoO_3$ and $Cu_2O$.

BACKGROUND OF THE INVENTION

This invention provides additives for plastics that will decrease their tendency to smoke when burned. It is believed that such use of the additives provided has not been described in the art.

Netherlands Pat. No. 69/18,861 is reported to teach that preparations of antimony trioxide and an inorganic salt impart flame and smoke reducing properties to resin compositions.

SUMMARY OF THE INVENTION

In one aspect, this invention provides a polyvinyl halide admixed with a smoke retardant amount of copper oxide. In another aspect, this invention provides polyvinyl halide compounded with a mixture of copper oxide and molybdenum oxide. In still another aspect, this invention provides polyvinyl halide blended with copper oxide and a molybdate such as ammonium paramolybdate. Cuprous oxide is the preferred copper oxide for the above compositions.

This invention also provides a method for imparting smoke retardancy to plastics which method comprises blending resins with compounds such as set forth above. Similarly, this invention provides blends of copper and molybdenum compounds for incorporation in resins. Such blends may be mixtures of the compounds themselves or the compound mixtures can be combined with the resin or other materials such as a solvent, or a plasticizer or other ingredient utilized to form a resin composition.

Smokes can be a hazard during a fire. Dense smoke hampers fire fighting measures and can obscure escape routes for those within a burning enclosure. Therefore, building materials which emit lesser amounts of smoke during combustion can be a safety feature. This invention serves to provide compositions with lessened tendencies to smoke and accordingly, one utility of this invention pertains to improvement in materials utilized in construction. However, formulations of this invention can be used wherever it is desirable to use materials which can lessen the amount of smoke produced upon combustion.

DESCRIPTION OF PREFERRED EMBODIMENTS

In the practice of this invention, a smoke retardant amount of additive is used to treat a combustible material such as a plastic resin.

Polyvinyl halide resins can be used in this invention. Applicable polyvinyl halides include homopolymers, copolymers and polymer mixtures. Illustrative and nonlimiting examples of applicable polyvinyl halide resins are:

(1) Homopolymers

Polyvinyl chloride, polyvinyl bromide, polyvinyl fluoride, polyvinylidene chloride, polydichlorostyrene and the like, (2) Copolymers Vinylchloride-vinyl acetate, vinylchloride-vinyl alcohol, vinylchloride-vinylidene chloride, vinylchloride-diethyl maleate, vinyl chloride esters of unsaturated alcohols and unsaturated acids and the like, and (3) Mixtures Polyvinyl chloride and polydichlorostyrene, polyvinyl chloride and vinyl acetate-vinyl chloride copolymer, polyvinyl chloride, polyvinylidene chloride, and a copolymer of vinyl chloride-diethylmaleate and the like.

The resins can be treated with the smoke retardant additive or additives in any convenient maner. In some instances, smoke retardancy may be achieved by treating one or more surfaces of a plastic article with the additive or additives such that a treated surface is overlayed or padded with the additive composition. However, in general, it is preferred to blend an additive within a resin composition. The blending can be accomplished by any appropriate blending or mixing technique available in the art.

In the practice of this invention, a smoke retardant amount of provided additive is used to treat a combustible substance. In general, there is usually a relationship between the smoke retardancy achievable and the amount of additive employed. Therefore, at least within some concentration range, usually a greater amount of additive will provide a greater amount of smoke retardancy, all other factors remaining the same. In some instances, there is a practical upper limit on the amount of additive used. This upper limit is based on secondary factors such as cost, ease of blending, or interference with some other desirable property of the substrate, for example. In many instances, from about 0.5 to about 40 parts are used for each 100 parts of substrate resin. Preferably from about 1 to about 30 parts for 100 parts resin, more preferably 1 to about 15 parts per 100 parts resin are employed. However, greater or lesser amounts can be used if desired.

Cuprous or cupric oxide can be used. Cuprous oxide has been shown to give a better response in some testing, hence it is preferred. The applicability of such oxides suggests the use of other copper compounds such as the corresponding sulfides, Cu(I) and Cu(II) chelates such as the acetonylacetates, copper salts of carboxylic acids such as the acetates and butyrates, hydrates of all these, and organocopper compounds such as the copper carbonyls.

Molybdenum trioxide, $MoO_3$, can be used in this invention. Also it has been found that molybdenum carbonyl and ammonium paramolybdate reduce smoke. These may be admixed with the copper oxides, for example. In general, the relative amount of copper compound to molybdenum compound on a weight basis can be from 1 part copper compound to 99 parts molybdenum compound, or from 1 part molybdenum to 99 parts copper compound. Greater or lesser amounts can be used if desired.

Typical mixtures of this invention are:

(a) $Cu_2O$-$MoO_3$ (50:50)
(b) $Cu_2O$-$MoO_3$ (67:33)
(c) $Cu_2O$-ammonium paramolybdate (50:50)

The parenthetical expressions refer to relative parts by weight. Thus, mixtures (a) and (c) have equal parts by weight. In mixture (b) twice as much copper compound is used for each unit weight of molybdenum compound.

Applicability of such mixtures suggest other molybdenum compounds can be blended; for example, oxides and sulfides viz. $MoO_2$, $Mo_2O_5$, $Mo_2O_3$, $MoS_2$, $MoS_3$, $MoS_4$, $Mo_2S_3$, metal molybdates such as ammonium and copper molybdate, molybdenum salts of carboxylic acids such as acetates and butyrates, chelates such as the acetylacetonates and organomolybdenum compounds. To illustrate the smoke retardation, the following example is presented.

EXAMPLE

Preparation of Sample:

| | Parts |
|---|---|
| "Ethyl" PVC resin SM-250 | 100 |
| Diisooctyl phthalate | 30 |
| Smoke retardant to be tested | 15 |
| Mark WS (stabilizer) | 1 |
| Stearic acid | 0.5 |

All ingredients were mixed by hand for 3-5 minutes. The mixture was milled on a two roll rubber mill at 310° F. for 5 minutes. The resulting sheets were stored at 73° F. overnight. Sample sheets 3½" x 1" x ¼" were molded at 350° F. and cooled to room temperature. Three samples 1" x 1" x ¼" were cut from each sample sheet.

Smoke Test

The samples were burned in a smoke chamber substantially in accordance with ASTM Method D2843-70. The samples were stored at 50% humidity for a minimum of 40 hours prior to testing. In the test an Am result less than 100 signifies smoke retardation.

| Results[1] | Am[2] | $t_A$-70 (min.)[3] |
|---|---|---|
| Blank | 100 | .31, .32, .36 |
| Copper (II) formate[4] | 98 | 0.50 |
| Copper (I) oxide | 95 | 0.90 |
| Copper (II) oxide | 97 | 0.61 |
| Molybdenum trioxide | 92 | 0.78 |
| Ammonium paramolybdate | 96 | 0.85 |
| $MoO_3$+CuO[5] | 87 | |
| $MoO_3$+$Cu_2O$[6] | 89 | 1.07 |
| Ammonium paramolybdate +$Cu_2O$[7] | 91 | 0.84 |

[1] Samples were placed on wire screen and wire basket was inverted over sample.
[2] Maximum percent light absorption.
[3] $t_A$-70 (min.)—time in minutes for light absorption to reach 70%.
[4] 15 phr. of compound incorporated in sample.
[5] 5 phr. of $MoO_3$ and 10 phr. $Cu_2O$.
[6] 7.5 phr. each of $MoO_3$ and $Cu_2O$.
[7] 7.5 phr. each of ammonium paramolybdate and $Cu_2O$.

It will be noted that the combinations of molybdenum and copper compounds yields results better than those obtained when the compounds are used alone (Am).

Analogous results are obtained when from 5 to 30 phr. (parts per hundred parts resin) are employed and when the homopolymers, copolymers and resin mixtures (listed when describing aplicable resins) above are used.

Compounds such as copper (I) acetate and $$CuCl \cdot CO \cdot 2H_2O$$

yield similar results.

Analogous results are obtained when the copper oxides and other copper compounds mentioned are admixed, one at a time, with $MoO_2$, $Mo_2O_5$, $Mo_2O_3$, $MoS_2$, $MoS_3$, $MoS_4$, $Mo_2S_3$, $Mo_2S_5$, ammonium molybdate, copper molybdate, molybdenum acetate, or molybdenum hexacarbonyl.

The copper- and copper-molybdenum containing smoke retardants provided by this invention can be used with polyvinyl halide-containing foams such as those which are the subject of U.S. 3,338,845, 3,338,846 and 3,409,580. Likewise, other resins such as polyamides, polyesters, polycarbonates, polyolefins, and the like may be rendered smoke retardant by the additives of this invention. Various papers such as newsprint, kraft paper, or paper clothing may also be treated with such additives.

As indicated above this invention can be used to provide plastic compositions for making articles which afford lesser amounts of smoke upon combustion. For manufacture of such articles the polymer may be supplied admixed with a smoke retardant amount of one or more additives provided by this invention.

This invention may be extended to smoke retardation of the polymers and mixtures defined above using cast iron powder in conjunction with the copper or copper-molybdenum additives provided. The cast iron powder can be used in amounts given above for the copper additives. As an illustration of this, using the procedure of the Example, a mixture of $Cu_2O$ and cast iron powder (7.5 phr. of each) gave an Am value of 89 and a $t_A$=70 (min.) value of 0.83. In addition to the above substrates, it is suggested that the additives of this invention can find smoke retardant use in ABS resins. This invention may be extended to copper-molybdenum materials wherein the molybdenum is in a complex salt of acids such as those found on pages 526-535 of *Fritz Ephraim, Inorganic Chemistry*, 6th Edition by P. C. L. Thorne and E. R. Roberts, Interscience Publishers Inc., New York, N.Y.; 1954. Exemplary salts of this type are ammonium 5-molybdocobaltate (III), 9-molybdonickelate (IV), 6-molybdoaluminate (III) and 6-molybdochromate (III). Exemplary materials of this type are disclosed in an application filed by myself and Gary L. Ter Haar on even date with this one and entitled "Smoke Retardants." This related application has Ser. No. 196,802. Applicable portions of that related case are incorporated by reference herein.

I claim:

1. As a composition of matter, a polyvinyl halide admixed with a smoke retardant amount of a copper oxide-molybdenum oxide mixture.

2. A composition of Claim 1 wherein said copper oxide is $Cu_2O$ and said molybdenum oxide is $MoO_3$.

3. A composition of Claim 2 wherein said mixture contains about equal portions of $Cu_2O$ and $MoO_3$ on a weight basis.

4. A composition of Claim 2 wherein the amount of $Cu_2O$ is about two times the amount of $MoO_3$ on a weight basis.

5. As a composition of matter, a polyvinyl halide admixed with a smoke retardant amount of a mixture of a copper oxide and ammonium paramolybdate.

6. A composition of Claim 5 wherein said mixture is about an equal weight amount of $Cu_2O$ and ammonium paramolybdate.

7. As a composition of matter a plasticized polyvinyl halide admixed with a smoke retardant amount of a copper oxide and iron powder.

8. A composition of Claim 7 wherein said oxide is cuprous oxide.

References Cited

UNITED STATES PATENTS

| | | | |
|---|---|---|---|
| 3,418,267 | 12/1968 | Busse | 260—45.75 |
| 3,154,515 | 10/1964 | Berridge | 252—8.1 |
| 2,286,744 | 6/1942 | Leatherman | 252—8.1 |
| 3,458,470 | 7/1969 | Edgar | 260—45.75 |
| 3,331,693 | 7/1967 | Taylor | 117—161 |
| 3,146,125 | 8/1964 | Schneble et al. | 260—41 |
| 2,517,223 | 8/1950 | Mantell | |
| 3,441,613 | 4/1969 | Nemec | |
| 3,254,110 | 5/1966 | Sennewald et al. | |
| 3,631,104 | 12/1971 | Habermann et al. | |
| 3,597,481 | 8/1971 | Tefertiller et al. | |

FOREIGN PATENTS 621,125   1963   Belgium.

OTHER REFERENCES

Handbook of Chemistry and Physics, 40th edition, 1959, Chemical Rubber Publishing Co., Cleveland, Ohio.

V. P. HOKE, Primary Examiner

U.S. Cl. X.R.

260—45.75 R, 45.75 C, 2.5 FP; 117—138.5